(12) United States Patent
Cowie et al.

(10) Patent No.: US 11,047,206 B2
(45) Date of Patent: Jun. 29, 2021

(54) VALVE

(71) Applicant: Interventek Subsea Engineering Limited, Aberdeen (GB)

(72) Inventors: Gavin David Cowie, Aberdeenshire (GB); John David Sangster, Aberdeen (GB)

(73) Assignee: INTERVENTEK SUBSEA ENGINEERING LIMITED, Aberdeen (GB)

( * ) Notice: Subject to any disclaimer, the term of this patent is extended or adjusted under 35 U.S.C. 154(b) by 444 days.

(21) Appl. No.: 15/735,828

(22) PCT Filed: Jul. 29, 2016

(86) PCT No.: PCT/GB2016/052353
§ 371 (c)(1),
(2) Date: Dec. 12, 2017

(87) PCT Pub. No.: WO2017/032971
PCT Pub. Date: Mar. 2, 2017

(65) Prior Publication Data
US 2020/0056447 A1 Feb. 20, 2020

(30) Foreign Application Priority Data

Aug. 25, 2015 (GB) .................................... 1515117

(51) Int. Cl.
*E21B 34/04* (2006.01)
*E21B 33/076* (2006.01)
(Continued)

(52) U.S. Cl.
CPC .......... *E21B 34/045* (2013.01); *E21B 33/076* (2013.01); *F16K 5/0605* (2013.01);
(Continued)

(58) Field of Classification Search
CPC .... E21B 34/045; E21B 33/076; F16K 5/0605; F16K 5/0626; F16K 15/03; F16K 15/181
See application file for complete search history.

(56) References Cited

U.S. PATENT DOCUMENTS 4,175,577 A 11/1979 Kacal et al.
8,752,632 B2 * 6/2014 Agerbæk ................ E21B 19/22
166/344

(Continued)

FOREIGN PATENT DOCUMENTS

GB 2275757 A 9/1994
WO WO-2016/001629 A1 1/2016
WO WO-2016/001650 A1 1/2016

OTHER PUBLICATIONS

International Search Report and Written Opinion for corresponding PCT Application No. PCT/GB2016/052353 dated Mar. 8, 2018.
(Continued)

*Primary Examiner* — Aaron L Lembo
(74) *Attorney, Agent, or Firm* — Harness, Dickey & Pierce, P.L.C.

(57) ABSTRACT

A valve apparatus comprises a housing defining a flowpath extending between a valve inlet and a valve outlet and an access port formed in a wall of the housing separately from the valve inlet and the valve outlet to provide access to the flowpath at a location which is intermediate the valve inlet and valve outlet. A valve mechanism is mounted within the flowpath, wherein the valve mechanism in insertable through the access port.

27 Claims, 6 Drawing Sheets

(51) Int. Cl.
 *F16K 5/06* (2006.01)
 *F16K 15/03* (2006.01)
 *F16K 15/18* (2006.01)

(52) U.S. Cl.
 CPC ............ *F16K 5/0626* (2013.01); *F16K 15/03* (2013.01); *F16K 15/181* (2013.01)

(56) References Cited

U.S. PATENT DOCUMENTS

| | | | |
|---|---|---|---|
| 9,410,391 B2* | 8/2016 | Guven | .................... E21B 29/04 |
| 2009/0272522 A1 | 11/2009 | Ring et al. | |
| 2010/0064885 A1 | 3/2010 | Werkhoven | |
| 2017/0122057 A1* | 5/2017 | Cowie | ................. E21B 33/0355 |

OTHER PUBLICATIONS

International Search Report PCT/ISA/210 for International Application No. PCT/GB2016/052353 dated Jan. 19, 2017.
Written Opinion of the International Searching Authority PCT/ISA/237 for International Application No. PCT/GB2016/052353 dated Jan. 19, 2017.

* cited by examiner

VALVE

This application is a national phase under 35 U.S.C. § 371 of PCT International Application No. PCT/GB2016/052353 which has an International filing date of Jul. 29, 2016, which claims priority to Great Britain Application No. 1515117.8, filed Aug. 25, 2015, the entire contents of each of which are hereby incorporated by reference.

FIELD

The present invention relates to a valve apparatus, such as a valve apparatus for use in subsea applications, such as in a subsea test tree (SSTT).

BACKGROUND

The use of valves is extensive across many industries, and in numerous applications. For example, many different types of valve are used in the oil and gas industry for flow control, pressure containment, well control or the like. Such use may be topside, for example on an oil and gas platform, downhole in a wellbore, subsea, for example in a Subsea Test Tree (SSTT), part of a landing string, in a pipeline or the like.

A valve typically includes a housing with a flow path therethrough, and a valve mechanism within the flow path for controlling flow, wherein the valve mechanism may comprise a valve member, actuator and the like. The housing typically includes an inlet and an outlet which are attached to surrounding equipment in such a way that the valve inlet and outlet can allow the passage of fluid and/or tooling therethrough. Where the housing and valve are required to contain a pressure, which can be extreme in some oil and gas applications, this pressure can act to force the separation of the valve from the surrounding equipment. A high degree of pre-compression may therefore be required at the join between the valve and the surrounding equipment to prevent such separation, which means imparting a compressive pre-stress on the valve and the surrounding equipment before or during use. While numerous connections are known, such as threaded connectors, threaded collars and the like, a flange connection is often desirable to robustly provide necessary connection pre-stress.

While using a flange connection may be desirable, the large volume of material required for the flange and necessary space for the connecting elements (e.g., bolts) may become a problem where the valve is for use in confined spaces, for example within a riser, blow out preventor (BOP) or the like, such as might be the case for in-riser SSTT applications. This problem may be further compounded due to the requirement for the valve inlet and/or outlet to be large enough to accommodate insertion/installation of the internal valve mechanism therethrough. In these circumstances, an increase in the size of the inlet and/or outlet to accommodate the necessary valve mechanism will result in a corresponding increase in size of a suitable flange connector. In some applications such an increase in connector size may not be possible due to space constraints, and as such a compromise may need to be made on use of alternative connector types which may not permit connector pre-stress to be achieved as readily or to the same degree as a flange connector.

Of course, in some applications it may be possible to utilise a smaller valve mechanism to allow a flange connector to be used, but this may not be practical, especially when bore diameter through the valve is of critical importance, for example to provide sufficient flow rates and/or accommodate the passage of equipment and tooling, and the like.

Also, in some circumstances the requirement to install a valve mechanism via the valve inlet and/or outlet may be difficult, and often may require specialised mechanisms, actuators and the like to be used, perhaps compromising on some design preferences.

SUMMARY

Aspects or embodiments relate to a valve or valve apparatus. Such a valve apparatus may be utilised in any flow control application, and may, for example, be of use in flow/pressure control applications associated with the exploration and production of hydrocarbons (or other subterranean resource) from subterranean formations. For example, the valve apparatus may be used or incorporated within a landing string, such as within a subsea test tree (SSTT), retainer valve or the like. The valve apparatus may be for use within a confined envelope, such as defined by a marine riser, a blowout preventor (BOP) or the like. The valve apparatus in some embodiments may be defined as an in-riser valve apparatus. The valve apparatus may be used or incorporated in a lubricator valve, subsurface safety valve (SSSV), drill stem test valve or the like.

The valve apparatus may include a housing defining a flowpath extending between a valve inlet and a valve outlet. An access port may be formed in a wall of the housing to provide access to the flowpath at a location which is intermediate the valve inlet and valve outlet. A valve mechanism may be mounted within the flowpath. The valve mechanism may be insertable through the access port.

The valve apparatus may comprise a connector arrangement for use in connecting said valve apparatus to a flow system, such as a pipeline, tubing string, completion string, landing string or the like.

In some embodiments the connector arrangement may comprise a threaded connector arrangement. In some embodiments the connector arrangement may comprise a flange connector arrangement.

The valve apparatus may comprise a first connector associated with the valve inlet, and a second connector associated with the valve outlet. The valve apparatus may comprise a first flange connector associated with the valve inlet. The valve apparatus may comprise a second flange connector associate with the valve outlet.

The valve apparatus may comprise a closure arrangement for sealably closing the access port. The closure arrangement may comprise a cover, hatch, sleeve, plug or the like.

The closure arrangement may comprise an actuator arrangement. The actuator arrangement may be for use in operating the valve mechanism. The actuator arrangement may be mounted within and/or on the housing so as to at least partially close the access port.

An aspect or embodiment relates to a valve apparatus, comprising:
- a housing defining a flowpath extending between a valve inlet and a valve outlet;
- an access port formed in a wall of the housing separately from the valve inlet and the valve outlet to provide access to the flowpath at a location which is intermediate the valve inlet and valve outlet; and
- a valve mechanism mounted within the flowpath, wherein the valve mechanism in insertable through the access port.

The flowpath may be configured to accommodate the flow or passage of fluid and/or objects therethrough.

The valve apparatus may be or define a SSTT.

The valve apparatus may define an in-riser or through-riser valve apparatus, for example for use within or as part of a landing string.

The valve apparatus may define an open-watersubsea valve apparatus.

The valve apparatus may be utilised in any flow/pressure control application, and may, for example, be for use in flow/pressure control applications associated with the exploration and production of hydrocarbons (or other subterranean resource) from subterranean formations. The valve apparatus may be used exclusively for flow/pressure control.

In some embodiments the valve apparatus may be configured to cut objects, such as wire, tooling, tubing or the like extending through or along the flowpath. In such cases the valve mechanism may also or alternatively be defined as a cutting mechanism.

In some embodiments the valve apparatus may be configured to both provide cutting and flow/pressure control. In other embodiments the valve apparatus may be configured to only provide cutting. In such an arrangement the valve apparatus may be defined as a cutting apparatus.

The valve mechanism may be installed within the valve housing via the access port, assisting to minimise or avoid issues with the insertion or installation through the valve inlet and/or outlet. In this way, other design requirements or preferences, for example associated with the valve inlet and/or outlet, may be more readily achievable. For example, the dimensions of the valve inlet and/or valve outlet may not necessarily be dictated by the size or geometry of the valve mechanism, and instead may be selected in accordance with other requirements, such as flow area, preferred connector types and the like.

It should be noted that while the housing of the valve apparatus is defined as including a valve inlet and a valve outlet, this definition is made with reference to the flow direction at any time during use of the valve.

The valve inlet and valve outlet may be configured similarly or identically.

The valve apparatus may comprise a connector arrangement for use in connecting said valve apparatus to a flow system, such as a pipeline, tubing string, completion string, landing string or the like.

The connector arrangement may be associated with the valve inlet and valve outlet, such that, in use, the flowpath of the valve housing may form part of the flow system, with the valve mechanism providing a degree of flow control within said flow system.

The valve apparatus may comprise a first connector associated with the valve inlet, and a second connector associated with the valve outlet.

The ability to install the valve mechanism within the housing without relying on insertion through the valve inlet and/or outlet may permit a more suitable connector arrangement to be utilised. For example, the valve inlet and/or valve outlet may be provided with a smaller geometry than would normally be required to accommodate insertion of the valve mechanism. The capability to provide such a smaller geometry may permit more design freedom on the form of the connector arrangement. This may have advantages in applications where the valve apparatus is deployed within a confined envelope or space, such as within a bore, for example a drilled bore, a bore defined by a tubing structure (e.g., a marine riser), a bore or internal space within other apparatus (e.g., a BOP) and/or the like. In such confined space applications, a preferred connector may still be achievable.

Further, the ability to install the valve mechanism within the housing without relying on insertion through the valve inlet and/or outlet may permit the valve mechanism to be accessed, for example for inspection, repair, replacement or the like while the housing remains connected to a flow system.

The connector arrangement may comprise a threaded connector arrangement. Such a threaded connector arrangement may permit a direct threaded connection with a flow system. Alternatively, or additionally, the connector arrangement may permit an indirect threaded connection with a flow system, for example via an intermediate connector component, such as a threaded collar, sleeve or the like.

The connector arrangement may comprise a profile configured to receive or accommodate dogs or slips of a connector.

In some embodiments the connector arrangement may comprise a flange connector arrangement. Such a flange connector arrangement may be provided in applications which would otherwise be difficult to accommodate, for example by virtue of removing or eliminating the design restriction on the valve inlet and/or outlet having to accommodate insertion of the valve mechanism.

The valve apparatus may comprise a first flange associated with the first connector. The valve apparatus may comprise a second flange associate with the valve outlet.

One or both of the first and second flanges may define holes to accommodate fasteners, such as bolts, stud, pins or the like.

One or both of the first and second flanges may comprise fasteners, such as bolts, studs, pins or the like, to be received with a flange of a separate component.

The valve apparatus may comprise a sealing arrangement for permitting a sealed connection between the valve housing and a flow system to be achieved. The sealing arrangement may comprise a gasket sealing arrangement or the like.

The housing may define a cavity therein, wherein the valve mechanism is located or locatable within said cavity. The cavity may define or form part of the flowpath through the housing. The cavity may define a geometry suitable to accommodate the valve mechanism therein. The cavity may define a geometry suitable to accommodate operation, for example movement, of the valve mechanism therein.

The access port may open into the cavity, thus allowing the valve mechanism to be installed through the access port into the cavity.

The flowpath may comprise a first portion, for example an inlet portion, extending between the valve inlet and the cavity.

The flowpath may comprise a second portion, for example an outlet portion, extending between the valve outlet and the cavity.

One or both of the first and second portions may define a smaller width, for example diameter, than the cavity.

The housing may define a valve seat located within the housing around a periphery of the flow path, wherein the valve seat is arranged for cooperation with the valve mechanism to facilitate fluid/pressure control and/or cutting. The valve seat may be located at an interface between the first and/or second portions of the flow path and the cavity.

The valve seat may facilitate sealing engagement with the valve mechanism to provide sealing of the flowpath, at least when the valve mechanism is configured to provide such sealing. In some embodiments the valve seat may cooperate with the valve mechanism, during operation of said valve mechanism, to cut an object positioned therebetween. For example, the valve mechanism may operate in conjunction with the valve seat to establish a cutting shear force within an object positioned therebetween.

At least a portion of the valve seat may be integrally formed with the housing.

At least a portion of the valve seat may be separately formed from the housing. Such an arrangement may permit replacement of wearable parts, for example. In one embodiment at least a portion of the valve seat may be insertable through the access port.

In some embodiments the valve mechanism may comprise a linearly operated valve mechanism.

The valve mechanism may comprise a rotary valve mechanism, arranged to rotate within the housing during operation.

The valve mechanism may comprise a ball valve mechanism.

The valve mechanism may comprise a flapper valve mechanism.

The valve mechanism may comprise a carriage member and a valve member mounted on the carriage member. The valve member may be mounted on the carriage member via a connection assembly which permits relative movement between the valve member and the carriage member. The carriage member may be moveable from a first position towards a second position to move the valve member into a position in which relative movement between the valve member and the carriage member permits the valve member to sealingly engage and disengage a valve seat to control flow along the flow path.

The valve mechanism may comprise a cutting arrangement. The cutting arrangement may be mounted on the carriage member. The carriage member may be moveable from a first position towards a second position to drive the cutting arrangement across the flow path to cut any object located therein.

In use, the carriage member may be located within its first position to maintain the flow path open, permitting flow and/or objects to pass along the flow path. In the event of a requirement to control flow along the flow path the carriage member may be moved from its first position towards its second position. Such movement in driving the cutting arrangement across the flow path will facilitate cutting of any object located within the flow path. Further, when the carriage member is located in its second position the valve member may then be operable, by virtue of its permitted relative movement with the carriage member, to selectively sealingly engage the valve seat, closing, or restricting the flow path. In this way the valve apparatus may advantageously function as a cut and seal valve assembly.

The valve apparatus may be operable to cut various objects located within the flow path, such as wireline, slickline, cable, braided wire, tools, rods, tubular members such as coiled tubing and the like.

The valve mechanism may be insertable through the access port when said valve mechanism is fully assembled.

Two or more components of the valve mechanism may be separately insertable through the access port and subsequently installed within the housing.

The access port may be provided through a side wall of the housing. In such an arrangement the valve apparatus may define a side-entry valve apparatus. The access port may define a geometry suitable to accommodate insertion of the valve mechanism therethrough. The access port may be generally circular, oval, elongate or the like.

The valve apparatus may comprise a closure arrangement for closing the access port in the housing. The closure arrangement may be removable or detachable from the housing.

The closure arrangement may comprise a sealing arrangement for sealably closing the access port. The sealing arrangement may comprise one or a plurality of sealing members.

The closure arrangement may comprise a fixture arrangement for fixing, for example releasably fixing, the closure arrangement relative to the housing. The fixture arrangement may comprise one or more of fasteners, bolts, screws, clamps, welding or the like.

The closure arrangement may comprise a closure member for closing (and optionally opening) the access port. A sealing arrangement may be provided between the closure member and the housing to seal the access port. A fixture arrangement may fix, for example releasably or permanently fix, the closure member relative to the housing In some embodiments a single closure member may be provided. Alternatively, a plurality of closure members may be provided.

The closure member may comprise a hatch member.

In one embodiment the closure member may comprise a sleeve located circumferentially relative to the housing, for example internally and/or externally of the housing, and arranged to axially extend over the access port to close said port.

The sleeve may be moveable axially (e.g., telescopically) relative to the housing to provided selective closing (and optionally opening) of the access port.

The sleeve may be slidably mounted relative to the housing.

The sleeve may be threadedly coupled to the housing. Such a threaded coupling may facilitate relative axial movement. Such threaded coupling may provide fixing of the sleeve relative to the housing, for example at least in a closed position.

The closure member may comprise a plug received within the access port. The plug may be threadedly received within the access port. The plug may be bolted or otherwise secured using fasteners within the access port.

The closure arrangement may comprise an internal closure member which closes the access port from a location internally of the housing. In such an arrangement internal pressure may assist to retain the internal closure member in a closed position.

The internal closure member may be insertable through the access port from an external location. The internal closure member may be insertable through the access port from an external location, and then manipulated or reconfigured to close the access port from an internal position within the housing. In one embodiment the access port may be generally elongate, and the internal closure member may be correspondingly elongate such that the closure member may be inserted through the access port in an appropriate orientation, for example lengthwise.

The closure arrangement may comprise a fastener arrangement for securing the internal closure member in a closed position. The fastener arrangement may comprise one or more of bolts, screws or the like. The fastener arrangement may comprise a clamping arrangement, for example to apply a clamping force between the internal closure member and the housing. The fastener arrangement may comprise a bayonet style arrangement.

The closure arrangement may comprise a secondary closure member. The secondary closure member may be arranged to close the access port from a location externally of the housing. In such an arrangement the secondary closure member may be defined as an external closure member. The secondary closure member may be secured over the access port after the internal closure member is in position.

The secondary closure member may be directly secured to the housing.

The secondary closure member may be secured to the internal closure member. Such an arrangement may facilitate clamping of both the internal and secondary closure members relative to the housing.

The housing, for example in the region of the access port, may define a closure profile to facilitate engagement with a closure arrangement. For example, the housing may define a lip portion or pocket adapted to receive a portion of the closure arrangement. The closure profile may facilitate correct alignment of the closure arrangement relative to the housing. The closure profile may facilitate retention, for example radial retention of a portion of the closure arrangement.

The valve apparatus may comprise an actuator for operating the valve mechanism. The actuator may comprise a hydraulic actuator, pneumatic actuator, mechanical actuator or the like.

The actuator may comprise a linear actuator for moving the valve mechanism, or at least a portion thereof, along a generally linear path. For example, the linear actuator may comprise one or more lead screws, linear pistons or the like.

The actuator may comprise a rotary actuator for rotating the valve mechanism, or at least a portion of the valve mechanism.

The actuator may be provided in accordance with a rotary actuator disclosed in international patent application PCT/GB2015/051827 and/or PCT/GB2015/051906, the disclosure of which is incorporated herein by reference.

In one embodiment the rotary actuator may be mounted externally of the flowpath, with a rotatable drive shaft extending to engage the valve mechanism.

The rotary actuator may comprise an actuator body and a vane piston within the actuator body, and coupled to a drive structure, such as a drive shaft, wherein the actuator body and vane piston together define a piston chamber. The vane piston may be rotatable around a rotation axis to vary the volume of the piston chamber, under the action of a working fluid within the piston chamber. Such rotational motion may be transmitted to the valve mechanism.

The actuator may be mounted on or relative to the housing to close the access port. In this arrangement the actuator may define a closure arrangement. The actuator may engage the valve mechanism via or through the access port. In such an arrangement an additional opening through the housing to accommodate a connection between the actuator and the valve mechanism may not be required, facilitating more robust pressure integrity of the valve apparatus to be achieved.

In one embodiment the actuator may comprise an actuator module mounted on the housing to close the access port. At least a portion of the actuator module may extend into the access port.

The actuator module may comprise an actuator body and a vane piston within the actuator body, and coupled to a drive structure, such as a drive shaft, wherein the actuator body and vane piston together define a piston chamber.

The flowpath through the housing may define a central axis. The central axis may be straight. Alternatively, the central axis may be deviate, for example at least a portion of the central axis may follow a curved or deviated path.

The housing may comprise a unitary component. Alternatively, the housing may be formed of multiple components which are assembled or secured together.

The valve apparatus may comprise a single valve mechanism.

The valve apparatus may comprise a plurality of a valve mechanisms mounted within the flowpath.

The valve apparatus may comprise a single access port.

The valve apparatus may comprise multiple access ports, wherein each access port may be arranged to accommodate part of or individual valve mechanisms. Where multiple access ports are provided a single or multiple closure arrangement may be provided.

An aspect or embodiment relates to a method for assembling a valve apparatus, comprising:
  providing a housing defining a flowpath extending between a valve inlet and a valve outlet; and
  inserting a valve mechanism through an access port provided in a wall of the housing separately from the valve inlet and valve outlet and into the flowpath at a location which is intermediate the valve inlet and valve outlet.

The method may comprise closing the access port with a closure arrangement.

The method may comprise mounting a valve actuator relative to the housing, and arranging the valve actuator in operational engagement with the valve mechanism.

The method may comprise mounting the valve actuator relative to the housing to close the access port. In such an arrangement the valve actuator may also define a closure arrangement.

The method for assembling a valve assembly may comprise assembly a valve apparatus according to any other aspect.

An aspect or embodiment relates to a valve apparatus, comprising:
  a housing defining a flowpath extending between a valve inlet and a valve outlet; and
  an access port formed in a wall of the housing to provide access to the flowpath at a location which is intermediate the valve inlet and valve outlet; and
  a valve mechanism mounted within the flowpath, wherein the valve mechanism in insertable through the access port.

An aspect or embodiment relates to a subsea test tree (SSTT), comprising:
  a housing defining a flowpath extending between a valve inlet and a valve outlet; and
  an access port formed in a wall of the housing separate from the valve inlet and valve outlet to provide access to the flowpath at a location which is intermediate the valve inlet and valve outlet; and
  a valve mechanism mounted within the flowpath, wherein the valve mechanism in insertable through the access port.

An aspect or embodiment relates to a subsea test tree (SSTT), comprising:
  a housing defining a flowpath extending between a valve inlet and a valve outlet;
  a first flange connector provided at the valve inlet;
  a second flange connector provided at the valve outlet;
  an access port formed in a wall of the housing separate from the valve inlet and the valve outlet to provide access to the flowpath at a location which is intermediate the valve inlet and valve outlet; and a valve mechanism mounted within the flowpath, wherein the valve mechanism in insertable through the access port.

The subsea test tree may comprise a closure arrangement for closing the access port.

An aspect or embodiment relates to a subsea test tree (SSTT), comprising:
a housing defining a flowpath extending between a valve inlet and a valve outlet;
a first flange connector provided at the valve inlet;
a second flange connector provided at the valve outlet;
an access port formed in a wall of the housing separate from the valve inlet and the valve outlet to provide access to the flowpath at a location which is intermediate the valve inlet and valve outlet;
a valve mechanism mounted within the flowpath, wherein the valve mechanism in insertable through the access port; and
an actuator mounted relative to the housing and in operational engagement with the valve mechanism, wherein the actuator closes the access port.

The SSTT of any aspect may define an in-riser or through-riser SSTT.

The SSTT of any other aspect may be mountable on or form part of a landing string.

The SSTT of any other aspect may be locatable within a BOP.

Further aspects of the present invention relate to a landing string.

Further aspects of the present invention relate to methods for performing wellbore intervention using a valve apparatus and/or a SSTT according to any other aspect.

Features defined in relation to one aspect may be applied in combination with any other aspect.

BRIEF DESCRIPTION OF THE DRAWINGS

These and other aspects and embodiments will now be described, by way of example only, with reference to the accompanying drawings, in which.

DETAILED DESCRIPTION OF THE DRAWINGS

Figure 1:
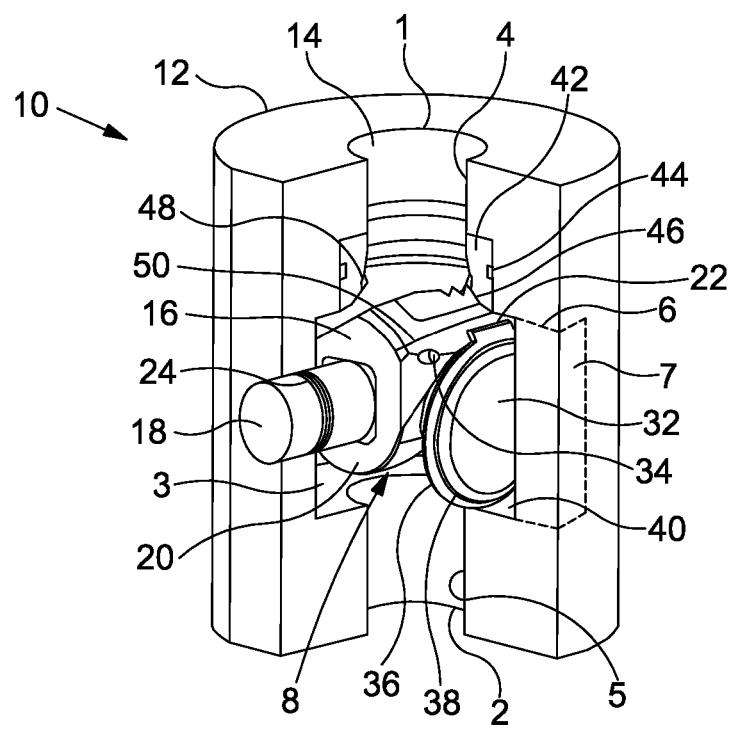
FIG. 1 is a diagrammatic partial sectional view of a valve apparatus in accordance with an embodiment of the present invention.

A valve apparatus, generally identified by reference numeral 10, in accordance with an embodiment of the present invention is shown in partial cross-section in FIG. 1. The apparatus 10 may be used in any valve application where flow control is required. As described in more detail below, the valve apparatus 10 may be used within a subsea test tree (SSTT).

The apparatus 10 comprises a housing 12 which defines an internal flowpath 14 for facilitating flow and objects to extend therethrough, wherein the flowpath 14 extends between a fluid inlet 1 and a fluid outlet 2. It will be understood of course that the inlet and outlet 1, 2 are only designated as such relative to a flow direction, and the designation as "inlet" or "outlet" may switch with flow direction.

Although not illustrated (and as will be described in more detail below in connection with a further embodiment), the apparatus 10 includes flange connectors on opposing ends at the inlet and outlet 1, 2 to permit the apparatus 10 to be coupled within a flow system (not shown).

The flowpath 14 includes a cavity 3 positioned intermediate the inlet and outlet 1, 2, a first or inlet portion 4 extending between the cavity 3 and the inlet 1, and a second or outlet portion 5 extending between the cavity 3 and the outlet 2. As illustrated, the first and second portions 4, 5 define a smaller width (diameter) than the width of the cavity 3.

The apparatus includes a side access port 6 extending through the side wall of the housing to provide access to the cavity 3 independently of the valve inlet and outlet 1, 2. A closure arrangement 7 (shown in broken outline and described in more detail below) sealably closes said access port 6.

A valve mechanism, generally identified by reference numeral 8, is mounted within the flowpath 14, specifically within the cavity 3. As will be described in more detail below, the valve mechanism 8 is insertable through the access port 6 to be installed within the cavity 3. Such an arrangement may assist to avoid issues and problems which might be associated with installing a valve mechanism through either or both the inlet and outlet 1, 2, which may otherwise require the inlet 1 and/or outlet 2 to be larger, which may have a consequential requirement for larger flange connectors to be present. This may present difficulties in those applications where a flange connector is required, but space is restricted, such as might be the case within a marine riser, BOP or the like.

The valve mechanism 8 includes a carriage member in the form of a saddle 16 which is rotatably mounted within the housing 12 via boss or shaft members 18 (only one visible in FIG. 1). The saddle 16 is shown in a first or open position in FIG. 1. The saddle 16 includes opposing rotary plates 20 (only one visible in FIG. 1) which are connected to the respective shaft members 18, with a cross member 22 extending between the rotary plates 20. At least one of the shaft members 18 extends through a wall of the housing 12, sealed using dynamic seals 24, and at least one shaft member 18 is secured to an actuator assembly (not shown). The actuator assembly may be any suitable actuator which can apply torque to the shaft member 18. However, in some example embodiments the actuator is a rotary actuator. The actuator may be provided in accordance with a rotary actuator disclosed in international patent application PCT/GB2015/051827 and/or PCT/GB2015/051906, the disclosure of which is incorporated herein by reference.

A cutting insert 28 which includes a profiled cutting edge 30 is mounted on the saddle 16, specifically on the cross member 22 of the saddle 16, at a leading edge thereof. The cutting insert 28 is operable to cut through an object located within the flow path 14 during rotation of the saddle 16 from its first position of FIG. 1, to a second or closed configuration, described later.

A valve member in the form of a flapper 32 is pivotally mounted on the saddle 16, specifically on the cross member 22, via a pivot pin 34. The flapper 32 defines a peripheral sealing face 36 which carries a sealing member 38, which in some embodiments includes a non-elastomeric sealing member. In other embodiments no sealing member may be present, or more than one may be utilised. When the saddle 16 is positioned in its first position of FIG. 1 the flapper 32 is located within a recess 40 formed in the housing 12. Accordingly, when the saddle 16 is positioned in the illustrated first position, the flapper 32 is oriented such that the sealing face 36 is generally outwardly facing, away from the flow path 14, and also generally positioned within the recess 40. Thus, the sealing face 36 may be protected to assist to minimise damage from flow and/or objects passing through or along the flow path 14. Although not illustrated, in some embodiments a protection seat profile may be formed or provided within the housing (for example on the closure arrangement 7) against which protection seat the flapper 32 engages when in its first position.

A valve seat 42 is mounted within the housing 12, around a periphery of the flow path 14, specifically at the interface between the first flowpath portion 4 and the cavity 3. The valve seat 42 is generally annular in form and is sealed relative to the housing 12 via a seal member such as an O-ring 44. Although not shown, the valve seat 42 may be mounted on a biasing member, such as a spring, to bias the seat member 42 in a desired direction relative to the housing 12. The valve seat 42 defines a sealing surface 46 which is arranged to cooperate with the sealing surface 36 of the flapper 32 when the saddle 16 is located in a second position, as described below. Such engagement between the sealing surfaces 36, 46 facilitates closure of the flow path 14.

A seat cutting insert 48 is mounted on the valve seat 42, and in use cooperates with the cutting insert 28 of the saddle 16 to cut an object within the flow path 14.

A wiper element 50 formed of a thermoplastic material such as PEEK, for example, is mounted on the saddle 16, specifically on the cross member 22 rearward of the cutting insert 28. The wiper element 50 functions to wipe the sealing surface 46 of the valve seat 42 in an effort to establish a more suitable surface to seal against.

Figure 2A:
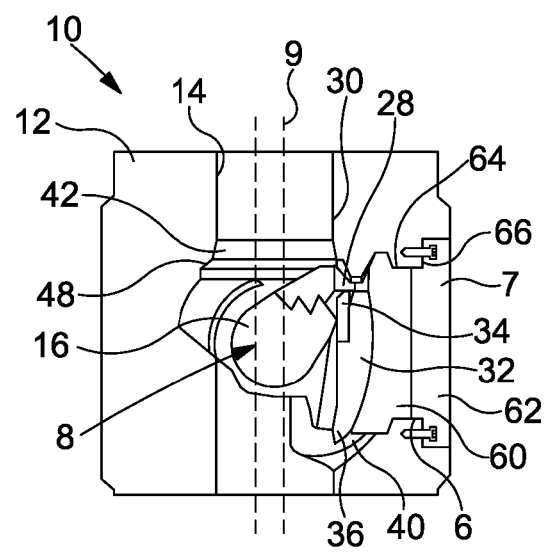
FIG. 2A is a longitudinal cross-sectional view of the valve apparatus of FIG. 1, shown in a fully open position.
Figure 2B:
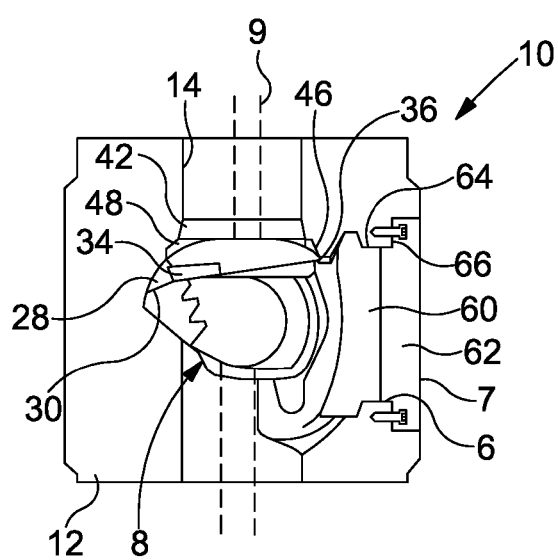
FIG. 2B is a longitudinal cross-sectional view of the valve apparatus of FIG. 1, shown in a fully open closed position.

Reference is now additionally made to FIGS. 2A and 2B in which a longitudinal cross-sectional view of the apparatus 10 is shown, with the valve mechanism 8 illustrated in its fully open position in FIG. 2A, and a closed position in FIG. 2B.

As noted above, when the valve mechanism 8 is in its open position as shown in FIG. 2A, the flapper 32 is located within the recess 40 and thus largely protected from flow and any objects passing along the flow path 14. For illustration purposes an object 9 (which may be wireline, coiled tubing or the like) is shown, in broken outline, extending through the flow path 14. Further, when in this position the flow path 14 is largely unrestricted, thus minimising any bore restrictions which might otherwise create pressure/energy losses in a flow, provide a snagging point for objects or the like.

When the flow path 14 is to be closed, one or more actuators (not shown) rotate the saddle 16 to cut through the object 9 by cooperation between the cutting inserts 28, 48 until the valve mechanism 8 is configured in its closed position illustrated in FIG. 2B. During rotation the wiper element 50 (FIG. 1) functions to wipe the sealing surface 46 of the valve seat 42, removing particles and other contaminates, preparing the surface 46 for a robust sealing engagement with the flapper 32.

When in the closed position the flapper 32 is fully pivoted about its pivot pin 34 such that the sealing surface 36 of the flapper 32 is engaged with the sealing surface 46 of the valve seat 42, thus preventing flow along the flow path 14. In the present embodiment the flapper 32 is passively mounted on the saddle 16, and as such is caused to pivot to provide sealing with the valve seat 42 by action of fluid flow and/or pressure within the flow path 14. For example, where the fluid pressure below the flapper 32 exceeds the pressure above, the flapper 32 will be moved and held in its closed position. Conversely, where the pressure above the flapper 32 exceeds the pressure below, the flapper 32 will be lifted from the valve seat 42, again allowing flow along the flow path. Such an arrangement permits the apparatus 10 to provide a pump-through capability, without altering the position of the saddle 16. However, in other embodiments the flapper 32 may be biased in a preferred direction, or a cam and follower mechanism may be utilised to drive the flapper 32 into engagement with the valve seat 42.

Both FIGS. 2A and 2B illustrate the access port 6 in the side wall of the housing 12 and the closure arrangement 7. In this case the closure arrangement 7 includes two closure members, specifically an internal closure member 60, and an external closure member 62. As will be described in detail below, the internal closure member 60 is inserted through the access port 6 and secured as illustrated, with a sealing arrangement 64 positioned between the internal closure member 60 and the housing 12. The external closure member is then secured to the housing 12 as illustrated, with a sealing arrangement 66 positioned between the internal closure member 60 and the housing 12.

Figure 3A:
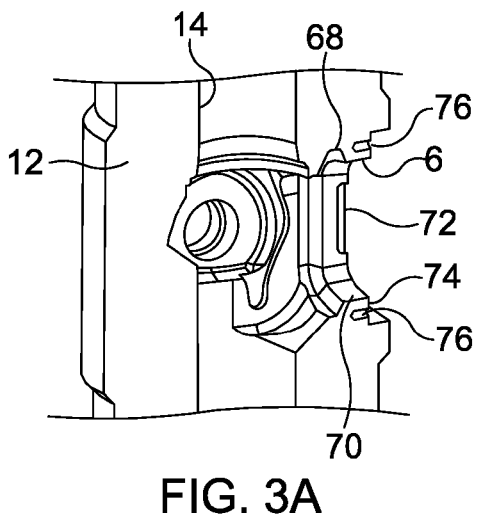
FIG. 3A to 3H illustrate a sequence of assembling the valve apparatus of FIG. 1.

A method for assembling the valve apparatus 10 will now be described with reference to the sequential illustrations in FIGS. 3A to 3G. Referring initially to FIG. 3A, the housing 12 is illustrated with the access port 6 open and nothing yet installed within the flow path 14.

As illustrated in FIG. 3A, the access port is generally elongate, and defines a profile or various features to facilitate engagement with the closure arrangement 7 during installation and when installed. In particular, the access port 6 includes an upper pocket 68 which is formed and arranged to receive and position an upper edge of the internal closure member 60 when installed. Further an internal sealing face 70 is provided which is intended to permit a seal to be established between the housing 12 and the internal closure member 60 when installed (using sealing arrangement 64—FIGS. 2A and 2B). Also, the access port includes notches 72 (only one visible) which provide a location feature for clamp plates (not shown but described later) to clamp the internal closure member 60 against the housing 12. Furthermore, the access port 6 defines an outer sealing surface 74 which is intended to permit a seal to be established between the housing 12 and the external closure member 62 when installed (using sealing arrangement 66—FIGS. 2A and 2B). A plurality of bolt holes 76 are provided around the periphery of the access port 6 which are used to permit bolting of the outer closure member 62 to the housing 12.

Figure 3B:
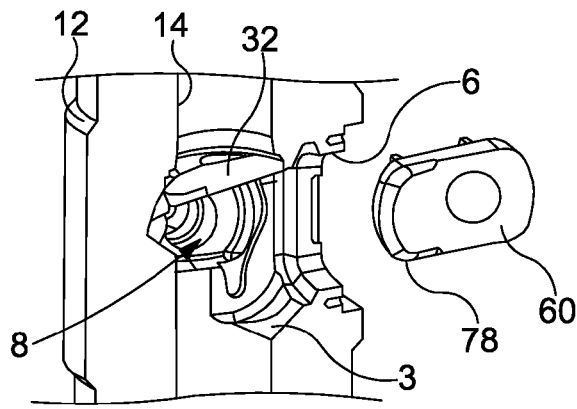
Figure 3C:
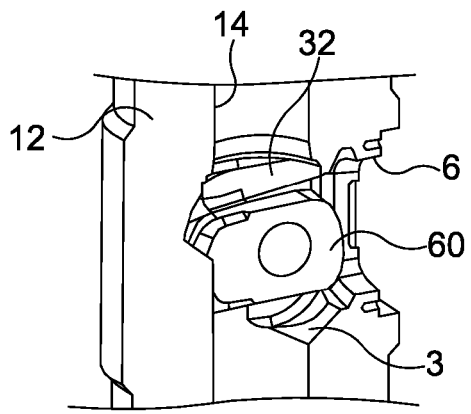
Figure 3D:
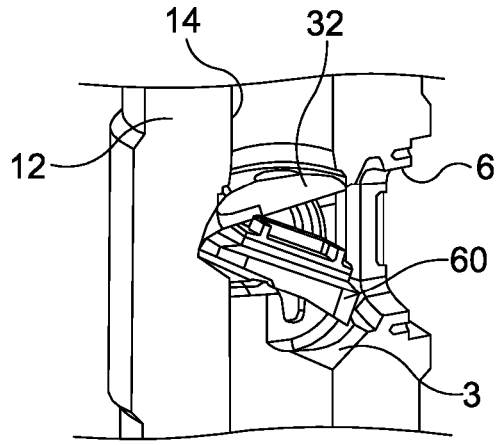
Figure 3E:
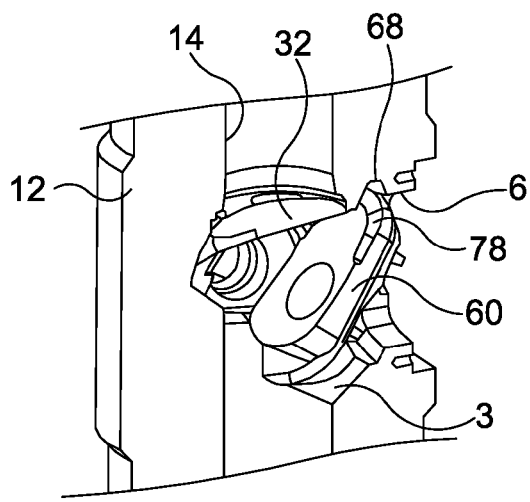
Figure 3F:
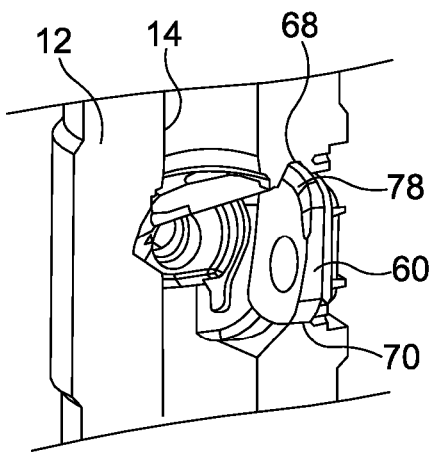

As illustrated in FIG. 3B, the valve mechanism 8 is inserted into the cavity 3 of the flow path 14 via the access port 6. It should be noted that only the flapper 32 of the valve mechanism 8 is illustrated for clarity purposes. The internal closure member 60 is then appropriately aligned with the access port 6, with a profiled edge 78 thereof leading. The internal closure member 60 is then be inserted, length and sidewise, through the access port 6 and into the cavity 3, as illustrated in FIG. 3C. The internal closure member 60 is then manipulated, as illustrated in FIGS. 3D and 3E, until the profiled edge 78 of the internal closure member 60 is received within the upper pocket 68 of the access port 6, following which, as illustrated in FIG. 3F, the internal closure plate 60 is pulled to be engaged with the internal sealing surface 70.

Figure 3G:
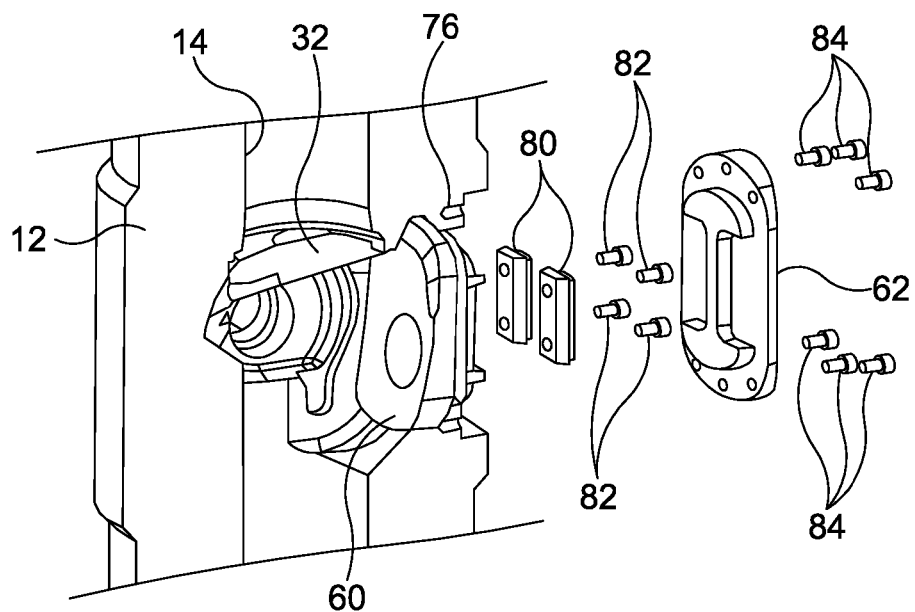
Figure 3H:
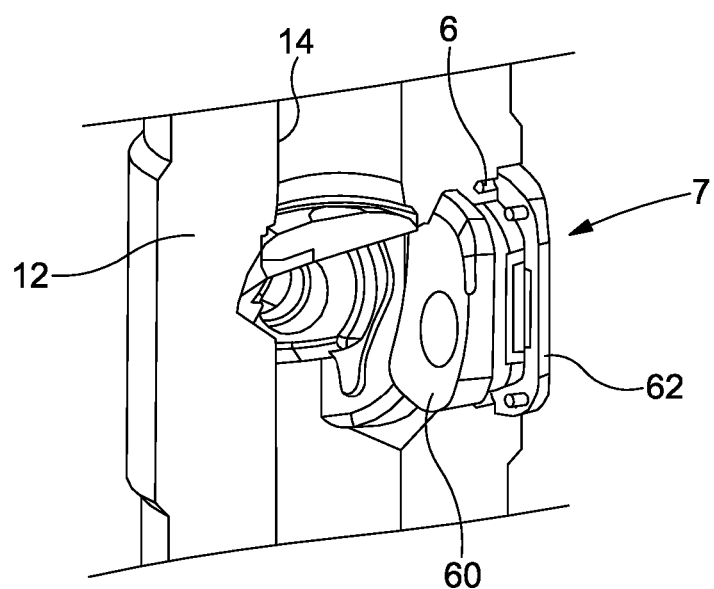

Subsequent to this, as illustrated in FIG. 3G, clamping pates 80 are received in the notches 72 (FIG. 3A) and secured via screws 82, thus clamping the internal closure member 60 in place. The external closure member 62 may then be offered to the housing and secured via bolts 84 received in bolt holes 76, until the final assembly is completed, as in FIG. 3H.

Accordingly, the assembly method does not rely on installation via the valve inlet 1 and outlet 2 (FIG. 1), as noted above. Furthermore, in the present embodiment the internal closure member 60 may be retained in place by internal fluid pressure.

It will be recognised that various other arrangements may be used to close the access port, some of which will now be described.

Figure 4:
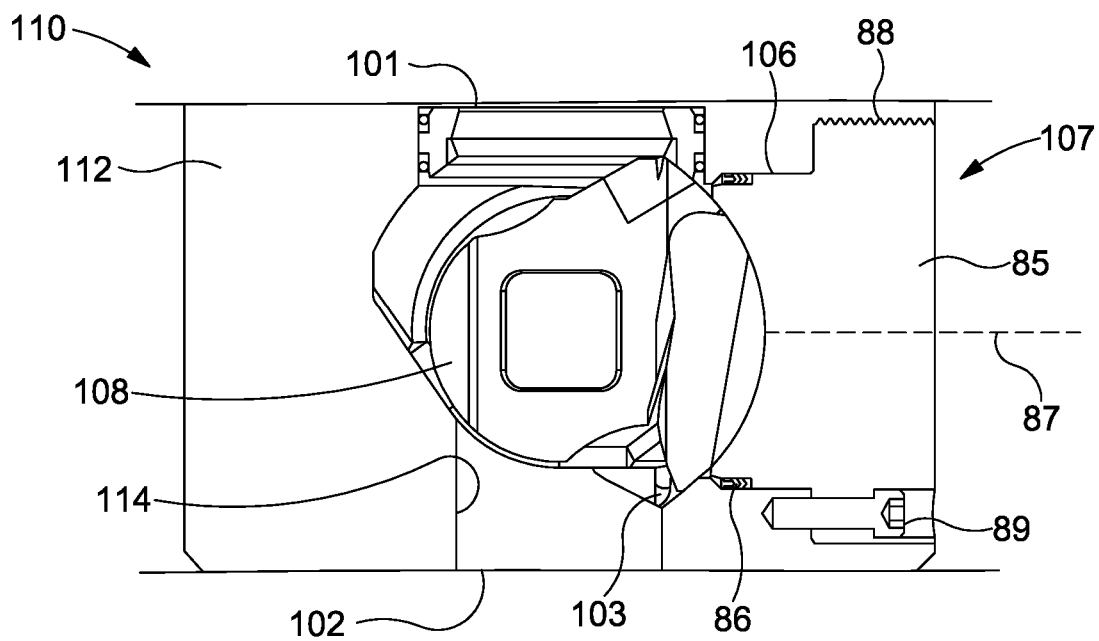
FIGS. 4 and 5 are diagrammatic sectional views of a valve apparatus in accordance with alternative embodiments.

FIG. 4 provides a diagrammatic cross sectional view of a valve apparatus, generally identified by reference numeral 110, in accordance with an alternative embodiment. The valve apparatus 110 is largely similar to apparatus 10 first shown in FIG. 1, and as such like features share like reference numerals, incremented by 100. For brevity, a complete description of the apparatus 110 will not be given, as this will be readily understood following the description of the apparatus 10. However, it is noted in particular that the apparatus 110 includes a housing 112 defining a flowpath 114 extending therethrough between an inlet 101 and outlet 102, with a valve mechanism 108 mounted within the flowpath 114, specifically within a cavity 103 of the flowpath 114. An access port 106 is provided through a side wall of the housing 112 and provides access to the cavity 103 for the installation (and/or inspection, removal or repair) of the valve mechanism 108.

In the present embodiment a closure arrangement 107 is provided in the form of a removable plug 85, shown installed within the access port 106 in FIG. 4 and sealed via seal 86. The removable plug 85 may be secured within the access port 106 in a number of ways, with two examples presented in FIG. 4. A first example, illustrated above broken line 87, includes a threaded connection 88. A second example, illustrated below the broken line 87, includes a bolt arrangement 89.

Figure 5:
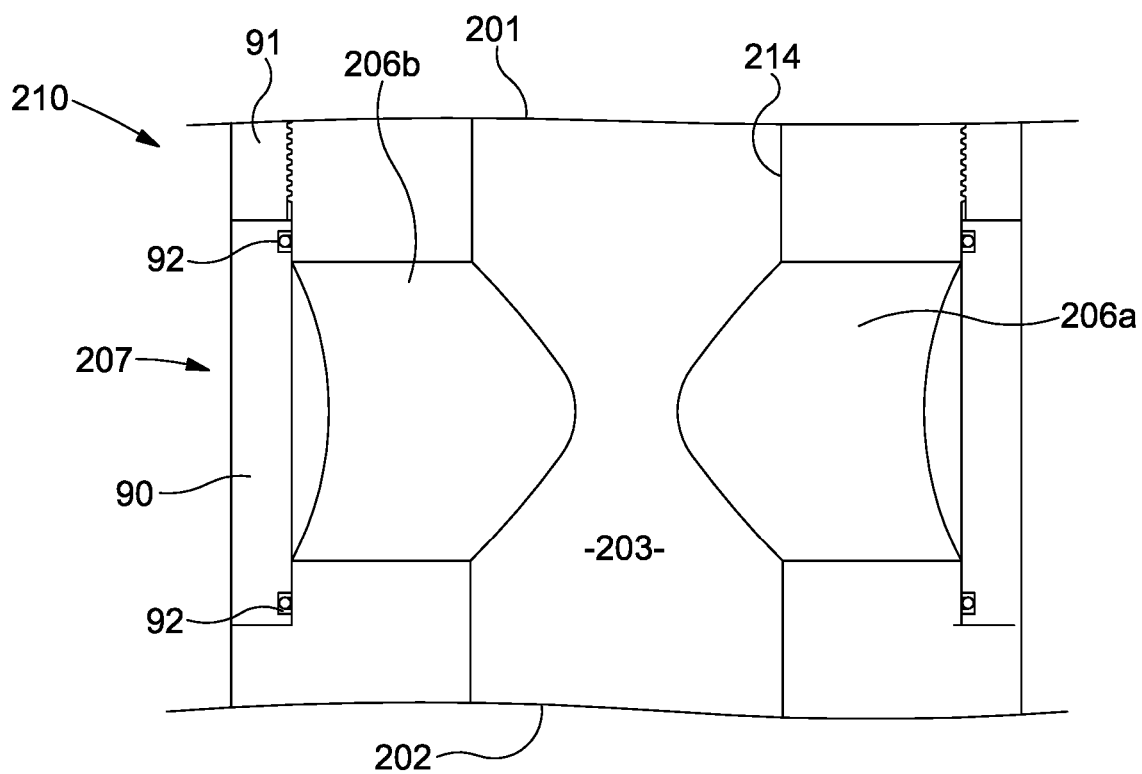

FIG. 5 provides a diagrammatic cross sectional view of a valve apparatus, generally identified by reference numeral 210, in accordance with an alternative embodiment. The valve apparatus 210 is largely similar to apparatus 10 first shown in FIG. 1, and as such like features share like reference numerals, incremented by 200. For brevity, a complete description of the apparatus 210 will not be given, as this will be readily understood following the description of the apparatus 10. However, it is noted in particular that the apparatus 210 includes a housing 212 defining a flowpath 214 extending therethrough between an inlet 201 and outlet 202, with the flow path includes a cavity 203 which is configured to receive a valve mechanism (not shown in the present illustration). In the present embodiment multiple access ports 206a, 206b are provided through a side wall of the housing 212 and provide access to the cavity 103 for the installation (and/or inspection, removal or repair) of a valve mechanism.

In the present embodiment a closure arrangement 207 is provided in the form of a axially moveable sleeve 90 which is shown extended over the housing 212 to cover the access ports 206a, 206b and provide sealing via seals 92. The sleeve 90 is secured in pace via a threaded collar or ring 91.

Figure 6:
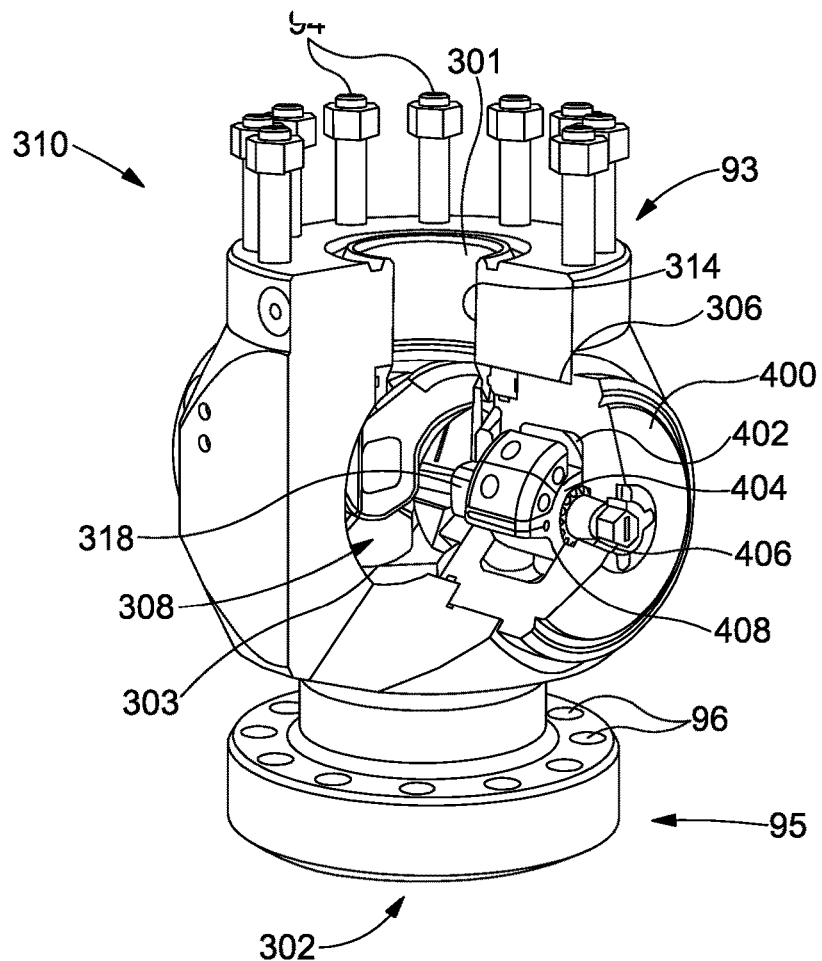
FIG. 6 is a diagrammatic partial cross-sectional view of a valve apparatus in accordance with another alternative embodiment.

A further alternative embodiment of a valve apparatus, generally identified by reference numeral 310, is illustrated in partial cross-section in FIG. 6. The valve apparatus 310 is largely similar to apparatus 10 first shown in FIG. 1, and as such like features share like reference numerals, incremented by 300. For brevity, a complete description of the apparatus 310 will not be given, as this will be readily understood following the description of the apparatus 10. However, it is noted in particular that the apparatus 310 includes a housing 312 defining a flowpath 314 extending therethrough between an inlet 301 and outlet 302, with a valve mechanism 308 mounted within the flowpath 314, specifically within a cavity 303 of the flowpath 114.

A first flange connector 93 including a plurality of threaded studs 94 is provided at the inlet 301, and a second flange connector 95 including a plurality of holes 96 is provided at the outlet 302, The first and second flange connectors 93, 95 facilitate flanged connection within a flow system (not shown).

An access port 306 is provided through a side wall of the housing 312 and provides access to the cavity 303 for the installation (and/or inspection, removal or repair) of the valve mechanism 308. In accordance with advantages already presented above, the ability to avoid installation of the valve mechanism 318 through either or both the valve inlet 301 and valve outlet 302 may permit the first and second flanges 93, 95 to remain an appropriate size, such as to ensure not only that a robust connection with external equipment is achieved (for example a pre-stressed connection), but that the apparatus 310 may be deployable in a desired location or operation, such as within a confined or restricted space.

Like in other embodiments a closure arrangement 307 is provided to close the access port 306. However, in the present embodiment the closure arrangement 307 is provided by or is defined by a rotary actuator which also provides rotational drive to the valve mechanism 308. The actuator may be provided in accordance with a rotary actuator disclosed in international patent application PCT/GB2015/051827 and/or PCT/GB2015/051906, the disclosure of which is incorporated herein by reference.

Figure 7A:
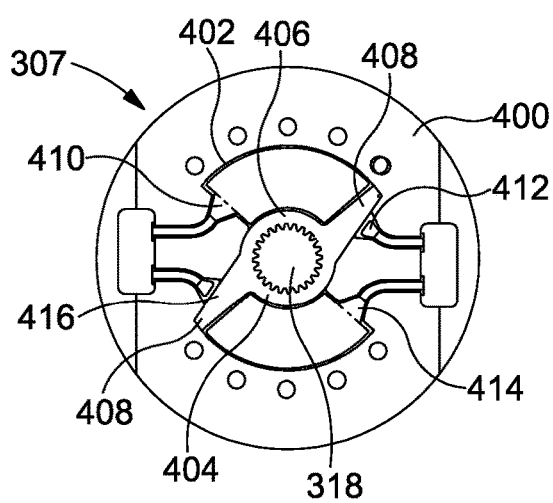
FIGS. 7A and 7B illustrate a rotary actuator of the valve apparatus of FIG. 6 in different actuation configurations.
Figure 7B:
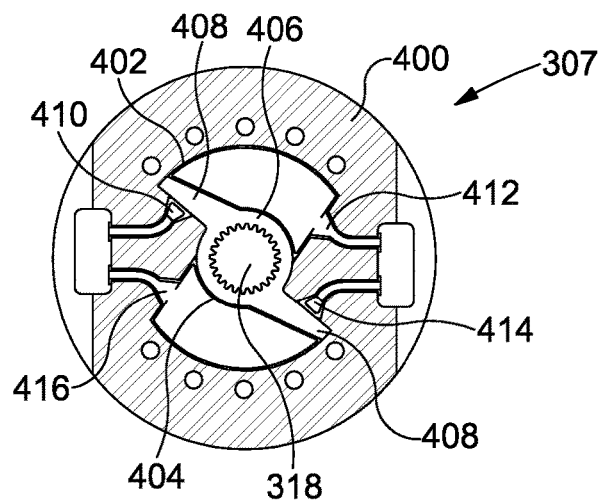

The actuator (closure arrangement) 307 will now be described in detail, referring additionally to FIGS. 7A and 7B which diagrammatically illustrate the actuator in different configurations. In particular, FIG. 7A illustrates the actuator 307 in a configuration in which the valve mechanism 308 is in an open position, and FIG. 7B illustrates the actuator 307 in a configuration in which the valve mechanism 308 is in a closed position.

The actuator 307 includes an actuator body 400 which is received and sealed within the access port 306. A drive shaft 318 extends from the valve mechanism 308 and into a cavity 402 defined within the body and is connected to the hub 404 of a rotary vane piston 406. The vane piston 406 includes vanes 408, extending from diametrically opposite sides of the hub 404. In use, the vane piston 406 is operable to rotate within the cavity 402 in response to or under the control of hydraulic fluid applied within the cavity via hydraulic ports 410, 412, 414, 416.

Accordingly, a compact apparatus 310 may be provided in which the benefits of a side-entry installation of a valve mechanism 308 is possible, with the side access port 306 closed by an actuator 307 which operates the valve mechanism 318. At least a portion of the actuator 307 may also be contained within the wall thickness of the housing, thus further enhancing the compact nature of the apparatus 310.

Figure 8:
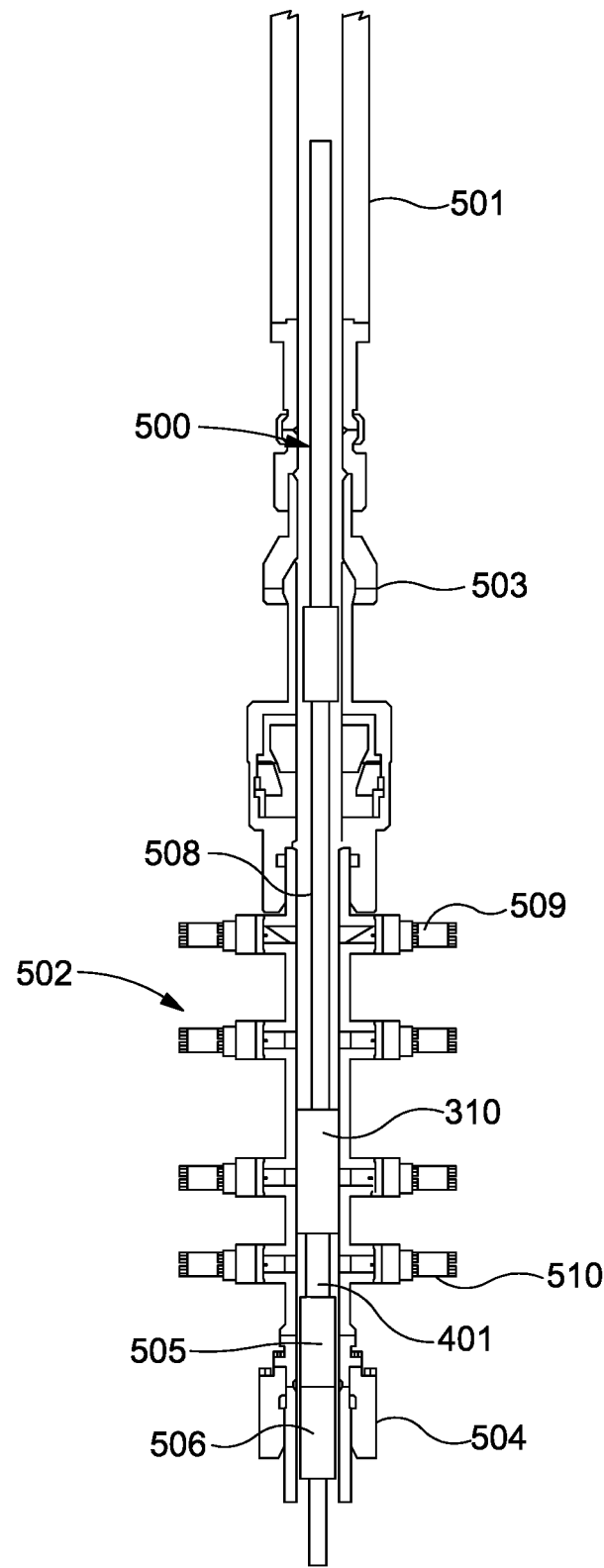
FIG. 8 is a diagrammatic illustration of a landing string in accordance with an embodiment of the present invention, wherein the landing string is shown in use within a riser and BOP.

An exemplary use of a valve apparatus, such as valve apparatus 310 of FIG. 6 is diagrammatically illustrated in FIG. 8, which provides the valve apparatus 310 functioning as a SSTT as part of a landing string 500. The landing string 500 may be used in multiple applications, such as in supporting wellbore intervention operations.

The landing string 500 is deployed through a marine riser 501 which is coupled to a BOP 502 via a flex joint 503, wherein the BOP 502 is mounted on a wellhead 504. A flow path extends through the riser 501, the landing string 500 and its component parts, and in use provides access to a well for fluids, tools (run on wireline or tubing) or other apparatus/materials as required in an intervention.

The valve apparatus 310 sits in the landing string 500 above a tubing hanger 505, which is adapted to couple the landing string to the wellhead 504. A tubing hanger running tool 506 may also be provided to run the landing string to the wellhead 504 through the marine riser 501 and couple the tubing hanger 505 to the wellhead 504.

A lower side of the valve apparatus 310 is connected to a slick joint 401 which is aligned with lower pipe rams 510 of the BOP 502 which may be closed against the slick joint 401 to form a seal in case of emergency.

In addition to the barrier provided by the valve apparatus 310, further valves may also be provided which sit above the BOP 502 when the landing string has been deployed, such as a retainer valve 507. The retainer valve 507 may be provided by a valve apparatus in accordance with an embodiment of the present invention.

The landing string 500 further includes a shear joint 508 which is aligned with shear rams 509 of the BOP 502.

All of the components of the landing string 500 are constrained to fit within the diameter of the riser 501. The components below the shear joint 508 must also fit within the BOP 502. In this respect, the ability to provide a valve apparatus which has the benefits of a flange type connector within such constrained working envelopes is particularly advantageous.

It should be understood that the embodiments described herein are merely exemplary and that various modifications may be made thereto without departing from the scope of the present invention. For example, in the embodiments presented a single valve mechanism is provided within the housing. However, in other embodiments two or more valve mechanisms may be provided, stacked in series. Such an arrangement may provide a double barrier (or triple barrier etc.) valve apparatus, which may have further benefits or application in some operations, such as in well control applications.

The invention claimed is:

1. A subsea test tree (SSTT) apparatus, comprising:
a housing defining a flowpath extending between a valve inlet and a valve outlet;
an access port formed in a wall of the housing separately from the valve inlet and the valve outlet to provide access to the flowpath at a location which is intermediate the valve inlet and valve outlet; and
a valve mechanism mounted within the flowpath, wherein the valve mechanism comprises a flapper mechanism and is insertable through the access port, wherein the SSTT apparatus is configured to provide both cutting of an object in the flowpath and flow control of the flowpath.

2. The SSTT apparatus according to claim 1, wherein the valve inlet and valve outlet define a smaller geometry than the access port.

3. The SSTT apparatus according to claim 1, comprising a connector arrangement for use in connecting said SSTT apparatus to a flow system,
wherein the connector arrangement is associated with the valve inlet and valve outlet, such that, in use, the flowpath of the valve housing forms part of a connected flow system, with the valve mechanism providing flow control within said flow system.

4. The SSTT apparatus according to claim 1, wherein the access port is provided through a side wall of the housing such that the SSTT apparatus defines a side-entry valve apparatus.

5. The SSTT apparatus according to claim 1, comprising a closure arrangement for sealably closing the access port in the housing.

6. The SSTT apparatus according to claim 5, wherein the closure arrangement comprises a closure member for closing the access port.

7. The SSTT apparatus according to claim 6, wherein the closure member comprises a sleeve located circumferentially relative to the housing and arranged to axially extend over the access port to close said port.

8. The SSTT apparatus according to claim 6, wherein the closure member comprises a plug received within the access port.

9. The SSTT apparatus according to claim 5, wherein the closure arrangement comprises an internal closure member which closes the access port from a location internally of the housing.

10. The SSTT apparatus according to claim 9, wherein the internal closure member is insertable through the access port from an external location, and then manipulated to close the access port from an internal position within the housing.

11. The SSTT apparatus according to claim 9, wherein the access port is elongate, and the internal closure member is correspondingly elongate.

12. The SSTT apparatus according to claim 9, wherein the closure arrangement comprises an external closure member arranged to close the access port from a location externally of the housing.

13. The SSTT apparatus according to claim 12, wherein the external closure member is directly secured to the housing.

14. The SSTT apparatus according to claim 12, wherein the external closure member is secured to the internal closure member.

15. The SSTT apparatus according to claim 14, wherein securing of the external and internal closure members together facilitates clamping of the closure members relative to the housing.

16. The SSTT apparatus according to claim 1, comprising an actuator for operating the valve mechanism.

17. The SSTT apparatus according to claim 16, wherein the actuator comprises a rotary actuator for rotating at least a portion of the valve mechanism.

18. The SSTT apparatus according to claim 17, wherein the rotary actuator comprises an actuator body and a vane piston within the actuator body and coupled to a drive shaft, wherein the actuator body and vane piston together define a piston chamber and the vane piston is rotatable around a rotation axis under the action of a working fluid within the piston chamber.

19. The SSTT apparatus according to claim 16, wherein the actuator is mounted relative to the housing to close the access port.

20. SSTT apparatus according to claim 1, wherein the housing defines a cavity therein and the valve mechanism is locatable and operable within said cavity, and wherein the access port opens into the cavity, allowing the valve mechanism to be installed through the access port into the cavity.

21. The SSTT apparatus according to claim 20, wherein the flowpath comprises a first portion extending between the valve inlet and the cavity, and a second portion extending between the valve outlet and the cavity, and wherein one or both of the first and second portions define a smaller width than the cavity.

22. The SSTT apparatus according to claim 21, wherein the housing defines a valve seat located at an interface between the first and/or second portions of the flowpath and the cavity, the valve seat being arranged for cooperation with the valve mechanism.

23. The SSTT apparatus according to claim 22, wherein the valve seat cooperates with the valve mechanism, during operation of said valve mechanism, to cut an object positioned therebetween.

24. SSTT apparatus according to claim 1, wherein the valve mechanism comprises a carriage member and a valve member mounted on the carriage member, via a connection assembly which permits relative movement between the valve member and the carriage member.

25. The SSTT apparatus according to claim 24, wherein the carriage member is moveable from a first position towards a second position to move the valve member into a position in which relative movement between the valve member and the carriage member permits the valve member to sealingly engage and disengage a valve seat to control flow along the flowpath.

26. The SSTT apparatus according to claim 24, wherein the valve mechanism comprises a cutting arrangement mounted on the carriage member and the carriage member is moveable from a first position towards a second position to drive the cutting arrangement across the flowpath to cut any object located therein.

27. The SSTT apparatus according to claim 26, wherein, in use, the carriage member is located within its first position to maintain the flowpath open, permitting flow and/or objects to pass along the flowpath, and the carriage member is moved from its first position towards its second position to drive the cutting arrangement across the flowpath and facilitate cutting of any object located within the flowpath, wherein when the carriage member is located in its second position the valve member is operable to selectively sealingly engage a valve seat.

* * * * *